United States Patent
Liu et al.

(10) Patent No.: US 12,031,922 B2
(45) Date of Patent: Jul. 9, 2024

(54) MULTI-ARM ROBOT USED FOR TUNNEL LINING INSPECTION AND DEFECT DIAGNOSIS IN OPERATION PERIOD

(71) Applicant: SHANDONG UNIVERSITY, Shandong (CN)

(72) Inventors: Bin Liu, Shandong (CN); Zhengfang Wang, Shandong (CN); Peng Jiang, Shandong (CN); Wenqiang Kang, Shandong (CN); Hanchi Liu, Shandong (CN); Jiaqi Zhang, Shandong (CN); Qingmei Sui, Shandong (CN)

(73) Assignee: SHANDONG UNIVERSITY, Jinan (CN)

( * ) Notice: Subject to any disclaimer, the term of this patent is extended or adjusted under 35 U.S.C. 154(b) by 556 days.

(21) Appl. No.: 17/289,280

(22) PCT Filed: Sep. 30, 2020

(86) PCT No.: PCT/CN2020/119578
§ 371 (c)(1),
(2) Date: Apr. 28, 2021

(87) PCT Pub. No.: WO2021/068846
PCT Pub. Date: Apr. 15, 2021

(65) Prior Publication Data
US 2021/0389257 A1     Dec. 16, 2021

(30) Foreign Application Priority Data

Oct. 9, 2019   (CN) ...................... 201910955353.X
Jan. 7, 2020   (CN) ...................... 202010014715.8
(Continued)

(51) Int. Cl.
*G01N 21/954*     (2006.01)
*F16L 55/40*      (2006.01)
(Continued)

(52) U.S. Cl.
CPC ............ *G01N 21/954* (2013.01); *F16L 55/40* (2013.01); *G01N 21/8851* (2013.01);
(Continued)

(58) Field of Classification Search
CPC .. G01N 21/954; G01N 21/8851; G01N 22/02; G01N 23/20008; G01N 23/203;
(Continued)

(56) References Cited

U.S. PATENT DOCUMENTS 4,629,369 A     12/1986   Cox et al.

FOREIGN PATENT DOCUMENTS

CN     202557555 U   * 11/2012
CN     105459153 A     4/2016
(Continued)

OTHER PUBLICATIONS

Dec. 31, 2020 Office Action issued in Chinese Patent Application No. 202010019203.0.
(Continued)

*Primary Examiner* — Peter M Bythrow
*Assistant Examiner* — Nazra Nur Waheed
(74) *Attorney, Agent, or Firm* — Oliff PLC

(57) ABSTRACT

A multi-arm robot used for tunnel lining inspection and defect diagnosis in an operation period, including a moving platform, where an environment detection device and a defect infection device are disposed on the moving platform, the defect infection device is disposed on the moving platform by using a multi-degree-of-freedom mechanical arm, and an attitude detection module is disposed on each multi-degree-of-freedom mechanical arm; a controller receives environmental data and mechanical arm attitude data sensed by the environment detection device and the attitude detection module, and sends a control instruction to the moving platform and the multi-degree-of-freedom
(Continued)

mechanical arm according to the environmental data, to implement movement of the robot; and the controller receives tunnel lining structural data sensed by the defect infection device, and performs defect diagnosis. Overall automatic inspection can be implemented both on the surface and inside of the tunnel lining.

4 Claims, 5 Drawing Sheets

(30) Foreign Application Priority Data

Jan. 7, 2020 (CN) .......................... 202010014732.1
Jan. 8, 2020 (CN) .......................... 202010019203.0

(51) Int. Cl.
*G01N 21/88* (2006.01)
*G01N 22/02* (2006.01)
*G01N 23/20008* (2018.01)
*G01N 23/203* (2006.01)
*G06N 20/00* (2019.01)
*F16L 101/30* (2006.01)

(52) U.S. Cl.
CPC ....... *G01N 22/02* (2013.01); *G01N 23/20008* (2013.01); *G01N 23/203* (2013.01); *G06N 20/00* (2019.01); *F16L 2101/30* (2013.01); *G01N 2021/9544* (2013.01)

(58) Field of Classification Search
CPC ........... G01N 2021/9544; G01N 21/88; G01N 33/00; G01N 29/04; G06N 20/00; F16L 55/40; F16L 2101/30; G01S 13/885; G01S 13/88; B61D 15/00; G05D 1/021; G05D 1/02; G05D 1/024; G05D 1/0214; B25J 9/0009; B25J 11/00; B25J 19/0004; B25J 5/007; G01C 7/06; Y02E 10/20; E21D 9/122; E21D 11/10; E21D 11/08; E21F 17/18; G01D 21/00; G01D 21/02; G01B 11/24; G01B 21/32; B61K 9/08; E02D 1/00; G01M 17/08; G06T 7/0002
See application file for complete search history.

(56) References Cited

FOREIGN PATENT DOCUMENTS

| | | | | |
|---|---|---|---|---|
| CN | 205353351 U | 6/2016 | | |
| CN | 106054180 A | 10/2016 | | |
| CN | 106080626 A | 11/2016 | | |
| CN | 108182450 A | 6/2018 | | |
| CN | 108279677 A | * 7/2018 | .......... | G05D 1/0214 |
| CN | 108407829 A | 8/2018 | | |
| CN | 207761711 U | 8/2018 | | |
| CN | 108657223 A | 10/2018 | | |
| CN | 108663090 A | 10/2018 | | |
| CN | 207991581 U | 10/2018 | | |
| CN | 108732546 A | 11/2018 | | |
| CN | 108732565 A | 11/2018 | | |
| CN | 108828589 A | 11/2018 | | |
| CN | 109333495 A | 2/2019 | | |
| CN | 208736365 U | 4/2019 | | |
| CN | 208993434 U | 6/2019 | | |
| CN | 110058224 A | 7/2019 | | |
| CN | 209063827 U | 7/2019 | | |
| CN | 209132427 U | 7/2019 | | |
| CN | 209141990 U | 7/2019 | | |
| CN | 110161043 A | 8/2019 | | |
| CN | 110228066 A | * 9/2019 | .......... | B25J 19/0004 |
| CN | 209394657 U | 9/2019 | | |
| EP | 0978718 A1 | 2/2000 | | |
| KR | 101229232 B1 | 2/2013 | | |
| KR | 101637414 B1 | * 2/2015 | | |

OTHER PUBLICATIONS

Jan. 5, 2021 International Search Report issued in International Patent Application No. PCT/CN2020/119578.
Jan. 5, 2021 Written Opinion issued in International Patent Application No. PCT/CN2020/119578.

* cited by examiner

MULTI-ARM ROBOT USED FOR TUNNEL LINING INSPECTION AND DEFECT DIAGNOSIS IN OPERATION PERIOD

BACKGROUND

Technical Field

The present disclosure belongs to the field of tunnel defect inspection, and in particular, to a multi-arm robot used for tunnel lining inspection and defect diagnosis in an operation period.

Related Art

The description in this section merely provides background information related to the present disclosure and does not necessarily constitute the prior art.

With the massive construction of tunnel projects, which are successively put into operation, safe operation of the tunnel projects is particularly important. During long-term service of tunnel projects, under the effect of various factors such as natural environment and climate changes, and periodic fatigue loads such as train working, a large number of tunnel structures in an operation period have structural concealed defects such as lining cracks, reinforcing bar rusty swelling, internal voids, and water seepage and mud leakage. The defects extremely easily degrade the performance of the tunnel lining structure, reduce the life of the tunnel, and even cause safety accidents, affect safety of train working, threaten people's personal and property safety, and cause bad social impact.

At present, the inspection of internal defects in the tunnel structure is still mainly based on manual inspection, and the diagnosis of the defects mostly depends on the subjective experience of the inspectors, which easily causes false negatives and false positives, and the inspection time is long, the labor cost is high, and the level of intelligence is low. The existing comprehensive tunnel inspection vehicle needs to use a vehicle as a mobile carrier, and it is difficult to realize the autonomous inspection of the tunnel environment. With the development of information technologies and automation technologies, inspection robots have been gradually applied to inspection of large-scale infrastructures such as bridges and dams in recent years due to features of the inspection robots, such as high efficiency, intelligence, and availability in hazardous environments. In underground engineering fields such as tunnels, most of the existing inspection robots are aimed at fixed inspection lines such as cable tunnels. The robots are mainly of a guide rail type. A robot-specific traveling track needs to be mounted in the tunnel, making it difficult for the inspection robots to be applicable to highways, railways, and subway tunnels. The emerging wall-climbing, flying, and quadruped robots used for tunnel defect detection have a small load, which is far from being capable of meeting the load demand for large-size and large-mass precise nondestructive inspection device.

Existing inspection robots used in subway tunnels and other tunnels with tracks are mostly equipped with line scan or surface scan high-definition cameras, infrared imagers, three-dimensional laser scanners, and other surface inspection devices, which have the following problems: (1) Surface inspection images acquired by surface scan high-definition cameras and infrared imaging devices are prone to distortion after being spliced, which severely affects the inspection effect; (2) the three-dimensional laser scanner can obtain an image of an absolute displacement, the image has no distortion, but the scanning speed is slow, resulting in a low inspection speed; (3) line scan cameras have a high imaging speed and small image distortion, but the imaging effect is severely affected by the change of the light source and the camera focal length; in highway tunnels without a fixed operating track, due to vulnerability to impact of the deviation of the vehicle's traveling track, the existing method requires a fixed focal length or readjustment for different tunnel diameters, and it is difficult to apply and promote the existing method in highway tunnels; and (4) the foregoing inspection devices can inspect only the cracks, peeling-off, water leakage, and other defects on the surface of the tunnel structure, and cannot meet the urgent demand for the inspection of internal damage of the structure.

SUMMARY

To overcome the foregoing deficiencies in the related art, the present disclosure provides a multi-arm robot used for tunnel lining inspection and defect diagnosis in an operation period. The multi-arm robot can perform quick automatic inspection on a tunnel structure, and perform fine inspection and intelligent diagnosis on millimeter-level damage, so that the convenience, rapidity, and accuracy of lining defect inspection and diagnosis can be greatly improved.

To achieve the foregoing objective, one or more embodiments of the present disclosure provide the following technical solutions:

A multi-arm robot used for tunnel lining inspection and defect diagnosis in an operation period, including a moving platform, where an environment detection device and a defect infection device are disposed on the moving platform, the defect infection device is disposed on the moving platform by using a multi-degree-of-freedom mechanical arm, and an attitude detection module is disposed on each multi-degree-of-freedom mechanical arm;

a controller receives environmental data and mechanical arm attitude data sensed by the environment detection device and the attitude detection module, and sends a control instruction to the moving platform and the multi-degree-of-freedom mechanical arm according to the environmental data, to implement movement of the robot; and the controller receives tunnel lining structural data sensed by the defect infection device, and performs defect diagnosis.

Further, the defect infection device includes a wideband air-coupled ground penetrating radar and/or an X-ray backscattering inspection device, and the environment detection device includes one or more of a linear array camera array, a near-infrared binocular stereo imaging camera, and an infrared thermal imaging device.

Further, the wideband air-coupled ground penetrating radar is disposed on the moving platform by using a foldable mechanical arm, a first section of the mechanical arm is fixed on the moving platform, and a last section of the mechanical arm is connected to a foldable supporting structure; the foldable supporting structure includes a plurality of supporting rods hinged to each other, and one of the supporting rods is fixedly connected to the last section of the mechanical arm in a vertical angle, and a wideband air-coupled ground penetrating radar is disposed on each supporting rod.

Further, each supporting rod is connected to the wideband air-coupled ground penetrating radar by using an adjustable bracket; the adjustable bracket includes an arc-shaped guide rail, a telescopic rod, and a push-open rod, the telescopic rod is connected to the push-open rod in a crossing and rotation manner, and end portions of the telescopic rod and the push-open rod are both in slidable connection to an arc-shaped track; the other end portion of the telescopic rod is connected to the supporting rod; and the wideband air-coupled ground penetrating radar is disposed on the arc-shaped track by using a sliding gimbal; and a gear is disposed at a crossing joint between the telescopic rod and the push-open rod, and is connected to a stepmotor; a slideway structure is disposed in an axial direction of the push-open rod, a rack is disposed on a slideway inner wall, and is engaged with the gear on the telescopic rod; and the controller controls the gear to rotate by using the stepmotor.

Further, the X-ray backscattering inspection device is disposed on the moving platform by using a load mechanical arm, the load mechanical arm is of a three-section mechanical arm structure; a first section of the load mechanical arm is fixed on the moving platform, a power supply and water cooling system is built in a second section of the load mechanical arm, and an end of a third section of the load mechanical arm is connected to the X-ray backscattering inspection device by using a radiation shielding component, and a radiation source and a single-photon detector array are built in the radiation shielding component.

Further, an adsorption load balance component is disposed on a bottom of the moving platform, the adsorption load balance component uses a multi-cavity negative pressure adsorption structure, and when a load mechanical arm works, negative pressure is rapidly generated through vacuum air supply for adsorption onto an earth surface.

One or more embodiments provide a self-adaptive floating type coupled device, including:

a housing, configured to mount a nondestructive inspection device therein, where one or more telescopic elastic wheels are provided on an outer surface of the housing, and are configured to bond to a measured surface of a tunnel lining, and a force transducer is built in each telescopic elastic wheel for sensing a bonding force between the self-adaptive floating type coupled device and the measured surface of the tunnel lining; and a laser ranging sensor array is further provided on the outer surface of the housing for monitoring a distance between the self-adaptive floating type coupled device and the measured surface; and both the force transducer and the laser ranging sensor array are connected to a controller, and the controller adjusts a relative position between the self-adaptive floating type coupled device and the measured surface according to information about the bonding force and the distance.

Further, the telescopic elastic wheel includes a rod member connected to the outer surface of the housing, an end of the rod member is connected to an end of the force transducer, and the other end of the force transducer is connected to an end of a spring, both the force transducer and the spring are accommodated in a columnar accommodating cavity, an end of the columnar accommodating cavity away from the rod member is blocked, and the other end is provided with an opening, and a size of the opening enables the columnar accommodating cavity to be sleeved outside of the rod member, and an outer side of the blocked end of the columnar accommodating cavity is connected to a walking wheel by using a bracket.

Further, the laser ranging sensor array is mounted on at least three side surfaces of the housing, and one of the side surfaces is a side surface facing toward an advancing direction.

Further, a nondestructive inspection device fixing platform is further disposed in the housing, and clamping slots capable of mounting probes of different inspection devices are reserved on the nondestructive inspection device fixing platform; and the nondestructive inspection device fixing platform includes a horizontal guide rail and two vertical guide rails vertically connected to the horizontal guide rail; gears are respectively disposed on two ends of the horizontal guide rail, and are respectively engaged with racks disposed on two opposite side surfaces in the housing; a rack is disposed on a side for fixing a nondestructive inspection device of the horizontal guide rail, and the two vertical guide rails are engaged with the rack on the horizontal guide rail by using gears.

Further, an obstacle avoidance monitoring device is further provided on an outer surface of the housing facing toward an advancing direction, and the obstacle avoiding monitoring device is composed of a laser radar and a surveillance camera, which are both connected to the controller, for monitoring front lining surface information in a running process.

Further, the end of the mechanical arm is connected to the self-adaptive floating type coupled device by using a foldable arched push-open device, the foldable arched push-open device includes a plurality of supporting frames connected to each other, and two adjacent supporting frames are connected through rotation of a rotary shaft, and the rotary shaft is driven by a reducer; each supporting frame is provided with an electric guide rail in a direction consistent with the supporting frame, and the self-adaptive floating type coupled device is connected to the electric guide rail by using a pulley, and is capable of moving along the electric guide rail.

Further, laser ranging sensors are disposed on both two ends of the electric guide rail, for sensing a distance from the measured surface; a torque sensor is disposed on an output shaft of the reducer for sensing a rotation angle between two supporting rods; the reducer, the laser ranging sensors, and the torque sensor are all connected to the controller, and the controller adjusts angles between the supporting frames by controlling the reducer according to angles between the supporting rods and the distance from the measured surface.

Further, a position sensor is disposed on a pulley for sensing a position of the self-adaptive floating type coupled device on the corresponding electric guide rail.

One or more embodiments provide a multifunctional gimbal, where the multifunctional gimbal is disposed on a robot platform, a plurality of inspection modules are provided in the gimbal, including a laser ranging module and a plurality of defect inspection modules, which are all connected to a controller, where the laser ranging module is disposed at a center, and the plurality of defect inspection modules are disposed around the laser ranging module; and the controller controls orientations of the plurality of defect inspection modules based on a distance measured by the laser ranging module from a measured surface, so that the plurality of defect inspection modules perform imaging on a same target region.

Further, the plurality of defect inspection modules include: a three-dimensional modeling and deformation inspection module, a crack and peeling-off inspection module, and a leakage inspection module; and the gimbal is hemispherical, and four holes are provided on a hemispherical section, for accommodating a laser emitting unit of the three-dimensional modeling and deformation inspection module, a visible light camera of the crack and peeling-off inspection module, an infrared camera of the leakage inspection module, and a laser emitting unit of the laser ranging module, and sizes of the four holes all reserve additional space for rotation of the laser emitting unit or the camera, where the laser emitting unit of the laser ranging module is located at a center, and the visible light camera and the infrared camera are respectively disposed on two sides of the laser emitting unit equidistantly, and the three are collinear.

Further, the plurality of defect inspection modules include: a three-dimensional modeling and deformation inspection module, a crack and peeling-off inspection module, and a leakage inspection module; and the plurality of inspection modules are all fixed in the multifunctional gimbal by using a supporting mechanism, the laser ranging module is disposed in the middle of the supporting mechanism, and the crack and peeling-off inspection module and the leakage inspection module are respectively disposed on two sides of a laser rangefinder, and are disposed on the supporting mechanism by using a steering motor.

Further, the gimbal is hemispherical, and two sides are separately connected to inside of a U-shaped bracket by using a lateral-roll motor, the U-shaped bracket is connected to a moving carrier by using a vertical-roll motor, both the lateral-roll motor and the vertical-roll motor are provided with a torque sensor, the U-shaped bracket is provided with a three-axis gyroscope, and both the torque sensor and the three-axis gyroscope are connected to the controller.

Further, positions of the plurality of inspection modules in the gimbal are initialized according to initial gravity information of the inspection modules and offset information of gravity centers of the inspection modules relative to three motor rotary shafts, to ensure stability of the gimbal.

One or more embodiments provide a ground penetrating radar intelligent inversion method, including the following steps:

obtaining a simulated training data set, where the simulated training data set includes a plurality of ground penetrating radar sectional view-dielectric constant distribution diagram data pairs;

obtaining a ground penetrating radar inversion deep learning network model according to the simulated training data set; and performing dielectric constant inversion according to ground penetrating radar inspection data acquired in real time based on the ground penetrating radar inversion deep learning network model.

Further, a method for establishing the simulated training data set includes:

randomly combining background media and defect internal media, and generating a sectional dielectric constant distribution diagram for each combination manner; and performing inversion on each dielectric constant distribution diagram, and generating a corresponding ground penetrating radar sectional view, to obtain the plurality of ground penetrating radar sectional view-dielectric constant distribution diagram data pairs, and using dielectric constant distribution diagram data in each data pair as a tag of the ground penetrating radar sectional view, to obtain the simulated training data set.

Further, the generating a sectional dielectric constant distribution diagram includes:

for a section formed through each combination manner, fitting interlayer interfaces and defect contours between various layers of background media, and generating the dielectric constant distribution diagram according to dielectric constants corresponding to various media in the corresponding combination manner.

Further, an architecture of the ground penetrating radar inversion deep learning network model includes a ground penetrating radar sectional view encoding structure and a dielectric constant distribution diagram decoding structure;

the ground penetrating radar sectional view encoding structure includes a plurality of layers of convolution structures and a plurality of layers of perceptron structures; the plurality of convolution structures include a plurality of convolutional layers, or a plurality of convolutional layers and a layer of dilated space pyramid pooling structure; and the dielectric constant distribution diagram decoding structure includes a plurality of deconvolutional layers, an upsampling layer, a layer of dilated space pyramid pooling structure, and a plurality of layers of convolution structures that are cascaded to each other.

Further, a ground penetrating radar background noise sectional view obtained through actual detection is further obtained, and is fused with a ground penetrating radar sectional view, to obtain a new training data set for training the ground penetrating radar inversion deep learning network model.

The foregoing one or more technical solutions have the following beneficial effects:

The moving robot of the present disclosure can travel autonomously, and in the process of traveling, the moving robot performs lining defect detection based on artificial intelligence.

By using a wheel-track hybrid moving platform, the robot can travel in tunnels in different fields such as highways, railways, and subways, and has a specific obstacle crossing capability; and the measurement device is integrated with the large-load mechanical arm to resolve the problem of the load capacity of the existing robot, and improve the stability of the robot.

An inspection end of the robot uses a foldable supporting structure, for mounting the wideband air-coupled ground penetrating radar, so that the flexibility is high, and the inspection range is large.

The self-adaptive floating type coupled device provided in the present disclosure is a "force-distance" self-adaptive floating type coupled device. The self-adaptive floating type coupled device is bonded to the lining measured surface by using the telescopic elastic wheel, and the bonding force is obtained by using the force transducer built in the telescopic elastic wheel, and the distance from the measured surface is obtained by using the laser ranging sensor array on the self-adaptive floating type coupled device; the degree of bonding between the self-adaptive floating type coupled device and the measured surface is adjusted based on the bonding force and the distance between the self-adaptive floating type coupled device and the measured surface, so that not only it can be ensured that the self-adaptive floating type coupled device can be bonded to the measured surface all the time, but also it can be ensured that the self-adaptive floating type coupled device is not damaged due to unevenness of the measured surface.

The "multi-eye" gimbal provided in the present disclosure includes the plurality of defect inspection modules, and visible light camera and infrared camera directions are corrected by using the laser ranging module therein as the center and using the distance measured by the laser ranging module from the measured surface as reference, to ensure that imaging is performed on the same target region, thereby facilitating subsequent comprehensive judgment.

The ground penetrating radar inspection data information provided by the present disclosure can be used to implement automatic inversion on complex ground penetrating radar inspection data. The method simultaneously realizes relatively high inspection precision and a relatively high processing speed, and ensures the real-time performance of ground penetrating radar data processing.

BRIEF DESCRIPTION OF THE DRAWINGS

The accompanying drawings constituting a part of the present disclosure are used to provide further understanding of the present disclosure. Exemplary embodiments of the present disclosure and descriptions thereof are used to explain the present disclosure, and do not constitute an improper limitation to the present disclosure.

Figure 1:
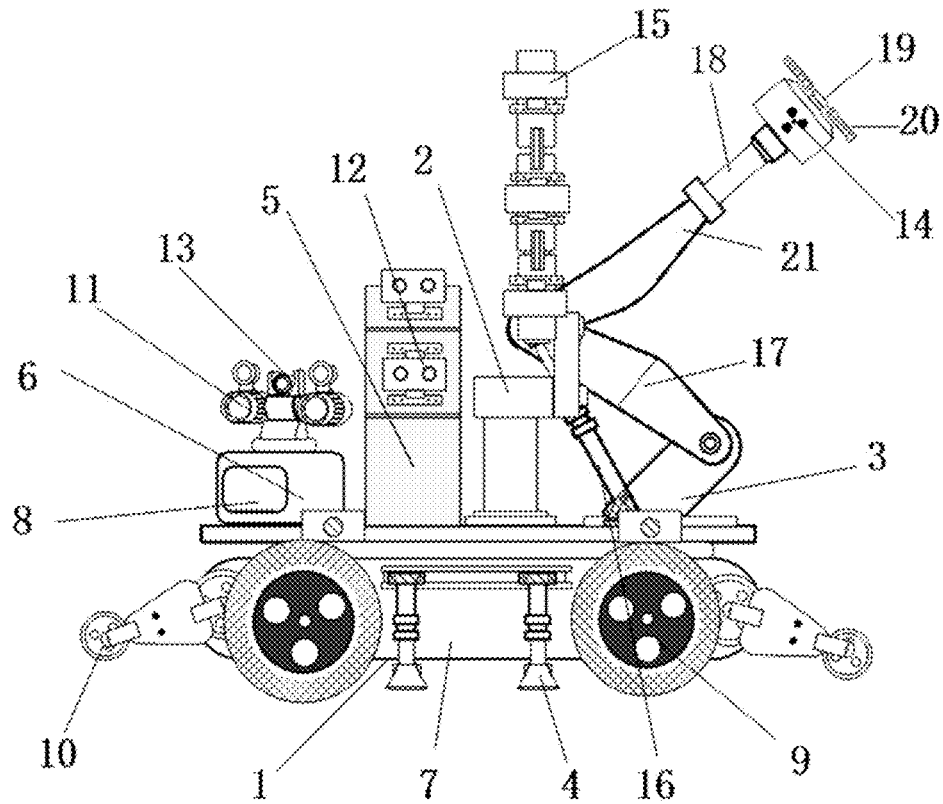
FIG. 1 is an overall structural diagram of a robot according to an embodiment of the present disclosure.

1. Wheel-track hybrid moving platform; 2. Foldable measuring arm; 3. Large-load mechanical measuring arm; 4. Adsorption load balance component; 5. Line scan camera base; 6. Robot control system; 7. Power and charging module; 8. Diagnosis server; 9. Wheeled moving structure; 10. Extensible track wheel; 11. Structured light binocular stereo imaging camera; 12. Linear array camera array; 13. Infrared thermal imaging device; 14. X-ray backscattering system; 15. GHz/THZ wideband air-coupled ground penetrating radar; 16. Hydraulic system; 17. Power supply and water cooling system of an X-ray backscattering inspection device; 18. Radiation shielding component; 19. Radiation source; 20. Single-photon detector array; 21. Precise attitude control unit of a large-load mechanical arm; 22. Arc-shaped guide rail; 23. Telescopic rod; 24. Push-open rod; 25. Sliding gimbal; 26. Rack; 27. Inertial navigation module; 28. Laser rangefinder; 29. Multi-shaft mechanical arm device; 30. Foldable arched push-open device; 31. Self-adaptive floating type coupled device; 32. Obstacle avoidance surveillance device; 33. Controller; 30-1. Hinge; 30-2. Reducer; 30-3. Laser ranging sensor; 30-4. Position sensor; 30-5. Torque sensor; 30-6. Supporting rod; 31-1. Housing; 31-2. Nondestructive inspection device fixing platform; 31-3. Laser ranging sensor array; 31-4. Obstacle avoidance monitoring device; 31-5. Telescopic elastic wheel; and 31-6. Force transducer.

DETAILED DESCRIPTION

It should be noted that, the following detailed descriptions are all exemplary, and are intended to provide further descriptions of this application. Unless otherwise specified, all technical and scientific terms used herein have the same meaning as commonly understood by a person of ordinary skill in the technical field to which the present disclosure belongs.

Terms used herein are only for describing specific implementations and are not intended to limit exemplary implementations according to the present disclosure. As used herein, unless the context clearly indicates otherwise, the singular form is also intended to include the plural form. Orientation or position relationships indicated by the terms such as "upper", "lower", "left", "right", "front", "rear", "vertical", "horizontal", "side", and "bottom" are based on orientation or position relationships shown in the accompanying drawings, and are merely relationship words that are determined for ease of describing the structural relationship between components or elements in the present disclosure, and are not intended to specifically refer to any component or element in the present disclosure. Therefore, such terms should not be construed as a limitation on the present disclosure. In the present disclosure, terms such as "fixedly connected", "interconnection", and "connection" should be understood in a broad sense. The connection may be a fixing connection, an integral connection or a detachable connection; or the connection may be a direct connection, or an indirect connection by using an intermediary. Relevant scientific research or technical personnel in the art may determine the specific meanings of the foregoing terms in the present disclosure according to specific situations, and such terms should not be construed as a limitation on the present disclosure.

The embodiments in the present disclosure and features in the embodiments may be mutually combined in case that no conflict occurs.

Figure 2:
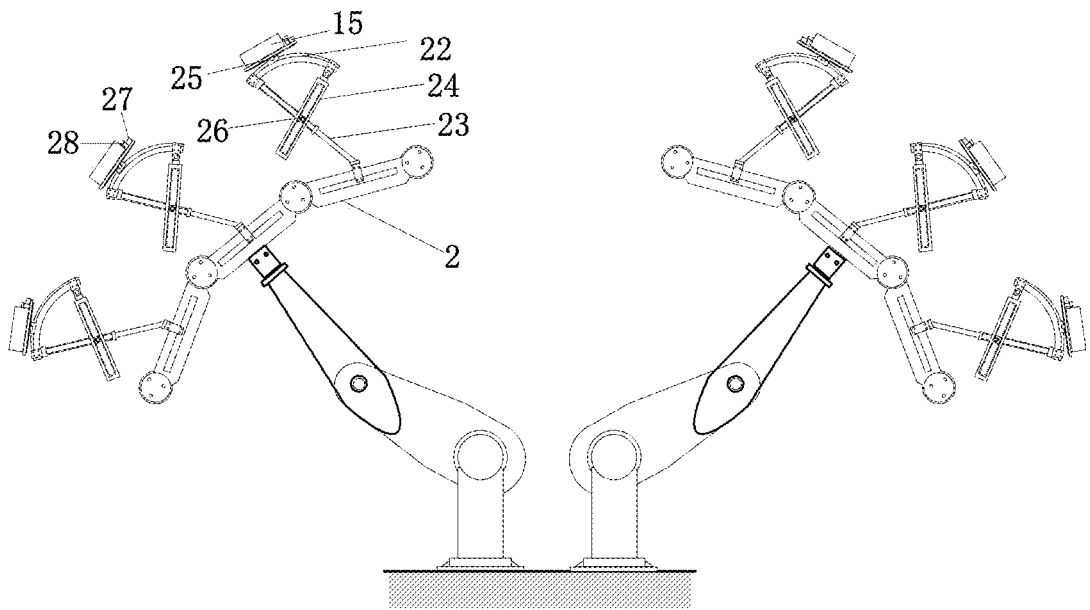
FIG. 2 is a structural diagram of a foldable measuring arm according to an embodiment of the present disclosure.

An embodiment of the present disclosure provides a multi-arm robot used for quick fine inspection and intelligent defect diagnosis of a tunnel lining in an operation period. As shown in FIG. 1 and FIG. 2, the multi-arm robot includes: a wheel-track hybrid moving platform 1, a plurality of foldable measuring arms 2 disposed on the moving platform 1, a large-load mechanical measuring arm 3 with a built-in inspection device, a line scan camera base 5, and a robot controller 6. A linear array camera array 12 is disposed on the line scan camera base 5. A structured light binocular stereo imaging camera 11 and an infrared thermal imaging device 13 are disposed on the robot controller 6. A wideband air-coupled ground penetrating radar 15 is disposed on the foldable measuring arm 2. An X-ray backscattering inspection device 14 is disposed on the large-load mechanical measuring arm 3.

The linear array camera array 12 is used for surface defect inspection. The near-infrared binocular stereo imaging camera 11 is configured to position and frame a tunnel environment with uneven illumination. The infrared thermal imaging device 13 is configured to avoid obstacles from a pipeline, a ventilation system, a power supply facility, and the like on a wall surface of a tunnel. The wideband air-coupled ground penetrating radar 15 and the X-ray backscattering inspection device 14 are both configured to inspect cracks and holes inside a tunnel lining structure. The X-ray backscattering inspection device 14 is configured to inspect centimeter-level cracks and voids within a range of 2 m.

Further, each of the foldable measuring arms 2 is of a multi-section mechanical arm structure, and sections of the mechanical arms are connected in a rotary manner. A first section of the mechanical arm is fixed on the moving platform 1, and a last section of the mechanical arm is connected to a foldable supporting structure. The foldable supporting structure includes a plurality of supporting rods hinged to each other, and one of the supporting rods is fixedly connected to the last section of the mechanical arm in a vertical angle. A wideband air-coupled ground penetrating radar 15 is disposed on each supporting rod. In this embodiment, the measuring arm 2 is of a three-section mechanical arm structure. The foldable supporting structure includes three supporting rods. A third section of the mechanical arm is fixedly connected to the middle supporting rod in a vertical angle.

Each supporting rod may be connected to a corresponding wideband air-coupled ground penetrating radar 15 by using an adjustable bracket. The adjustable bracket includes an arc-shaped guide rail 22, a telescopic rod 23, and a push-open rod 24. The telescopic rod 23 and the push-open rod 24 are disposed in a crossing and rotation manner, and end portions of the two are both in slidable connection to an arc-shaped track. When a crossing angle between the two changes, the end portions correspondingly slide along the track. The other end portion of the telescopic rod is connected to the supporting rod.

In this embodiment, end portions of the telescopic rod 23 and the push-open rod 24 are both provided with sleeving members, sleeved on the arc-shaped track. The telescopic rod 23 is a two-level telescopic rod, including an internal rod member and an external rod member. The internal rod member is connected to the supporting rod by using a connection member. In addition, the internal rod member is rotatably connected to the connection member, and a supporting member is capable of sliding along an axial direction of the supporting rod. An end portion of the external rod member is connected to an end of the arc-shaped guide rail 22. The other end of the arc-shaped guide rail 22 is connected to the push-open rod 24, and the external rod member is connected to the push-open rod in a crossing manner. A gear is disposed at a crossing between the external rod member and the push-open rod. A slideway structure is disposed in an axial direction of the push-open rod. A rack 26 is disposed on a slideway inner wall, and is engaged with the gear on the external rod member. When the controller controls the gear to rotate by using a stepmotor, an opening angle of the push-open rod can be adjusted. When the crossing angle between the external rod member and the push-open rod is adjusted, the push-open rod may be enabled to move along the guide rail, to change the length of the arc-shaped guide rail. Telescopic movement of the telescopic rod 23 can adjust a distance from a measured structural surface within a specific range.

A sliding gimbal 25 is disposed on the arc-shaped guide rail, and is capable of sliding along a surface of the arc-shaped guide rail. The wideband air-coupled ground penetrating radar 15 is disposed on the sliding gimbal 25.

An inertial navigation module 27 and a laser rangefinder 28 are further provided on the sliding gimbal 25 on the arc-shaped guide rail. In a traveling process, information about a foldable arm attitude angle and a distance from the tunnel surface is measured and calculated in real time. The information is fed back to the robot controller, to quickly control the opening angle of the foldable measuring arm and the distance, so that a distance between the ground penetrating radar equipped on the measuring arm and the tunnel surface basically remains constant.

A person skilled in the art may understand that, the quantity of sections of the mechanical arm, the quantity of supporting rods included in the foldable supporting structure, and the quantity of sections of the telescopic rod can all be changed according to requirements, and are not limited herein.

The load measuring arm 3 with a built-in detection device uses a structure of a three-section mechanical arm. The first section of the mechanical arm 3 is fixed on the moving platform 1. An end of the third section of the mechanical arm is connected to the X-ray backscattering inspection device 14 by using a radiation shielding component 18. A power supply and water cooling system 17 is built in the second section of the mechanical arm, for supply power to and cool the X-ray backscattering inspection device 14. To reduce the load on a top end of the third section of the mechanical arm, the radiation shielding component 18 is of a cylindrical structure, closely bonded to a cylindrical front arm. A radiation source 19 and a single-photon detector array 20 are built in the radiation shielding component 18. A precise attitude control unit 21 of a large-load mechanical arm is separately disposed in the third section of the mechanical arm, to control multi-angle fine actions completed by the measuring arm, such as telescopic movement and rotation, and avoid obstacles from a pipeline, a ventilation system, a power supply facility, and the like on a wall surface of a tunnel. To improve the load capacity of the large-load measuring arm, a hydraulic system 16 is further disposed. An end of the hydraulic system 16 is connected to the moving platform 1, and an end is connected to a joint between the second and third sections of the mechanical arm. The X-ray backscattering inspection device 14 is configured to inspect millimeter-level internal crack damage inside the tunnel lining structure. An inertial navigation module 27 and a laser rangefinder 28 are further disposed on a front end of the third section of the mechanical arm.

Specifically, on the moving platform 1, the large-load measuring arm 3 is disposed on the front end, and two foldable measuring arms 2 are disposed on the moving platform 1 behind the large-load measuring arm 3, and the two foldable measuring arms 2 are symmetrically distributed in a left-right direction.

An inertial navigation module and circularly arranged laser rangefinders are disposed on a front end of the wheel-track hybrid robotic chassis. In a traveling process, information about an attitude angle and a distance from the tunnel surface is measured and calculated in real time. The information is fed back to the robot controller, to quickly control opening angles of four foldable measuring arms and the distance, so that a distance between the camera and the ground penetrating radar equipped on the measuring arms and the tunnel surface basically remains constant, thereby ensuring that surface images and ground penetrating radar information acquired during rapid traveling are not distorted.

An adsorption load balance component 4 is disposed on a bottom of the wheel-track hybrid moving platform 1, and the adsorption load balance component 4 uses a multi-cavity negative pressure adsorption structure, disposed on the bottom of the wheel-track hybrid moving platform 1. When the large-load mechanical arm works, negative pressure is rapidly generated through vacuum air supply for adsorption onto an earth surface, to quickly keep the robot stable, thereby avoiding the problem of a long system open-up time caused by use of the conventional hydraulic bracket, and improving working efficiency.

A power and charging module 7 is further disposed on the bottom of the wheel-track hybrid moving platform 1 to drive the robot to travel and provide a power supply for an inspection system. The power and charging module 7 includes two sets of charging devices: storage battery charging and wireless charging systems, and can charge a battery module in wireless and wired charging manners.

The wheel-track hybrid moving platform 1 is of a wheel-track type. A wheeled moving structure 9 is configured to travel in a highway tunnel. In addition, extensible track wheels 10 are disposed on front and rear ends of the platform and can travel in tunnels with tracks such as highway tunnels and subway tunnels. The track wheels can prop up to some extent, to ensure the obstacle surmounting capability of the robot during traveling in an uneven road surface.

A diagnosis server 8 is built in the robot controller 6. The controller 6 receives data obtained by the structured light binocular stereo imaging camera 11, positions and frames a tunnel environment with uneven illumination, controls autonomous traveling of the robot, and also performs intelligent diagnosis on defects by using deep learning algorithms built in the diagnosis server 8.

The multifunctional nondestructive structural defect inspection system includes surface defect inspection instruments such as the structured light binocular stereo imaging camera 11, the linear array camera array 12, and the infrared thermal imaging device 13, and internal defect inspection devices such as the X-ray backscattering system 14 and the GHz/THZ wideband air-coupled ground penetrating radar 15.

By using a wheel-track hybrid moving platform, the robot can travel in tunnels in different fields such as highways, railways, and subways, and has a specific obstacle crossing capability; and the measurement device is integrated with the large-load mechanical arm to resolve the problem of the load capacity of the existing robot, and improve the stability of the robot.

Conventional contact nondestructive inspection systems working in manners such as stamping, ultrasonic waves, and impact-echo are replaced with non-contact X-ray backscattering systems, to improve inspection precision of defects such as internal cracks, and improve inspection efficiency.

An inspection end of the robot uses a foldable supporting structure, for mounting the wideband air-coupled ground penetrating radar, so that the flexibility is high, and the inspection range is large.

Laser rangefinders are mounted on end portions of the large-load measuring arm and the foldable supporting structure, to ensure that the distance between the inspection device and the measured tunnel wall is dynamically adjusted in real time, ensure that a measured image is not distorted during high-speed movement of the robot, and also ensures that the inspection device is not in direct contact with the tunnel wall, thereby protecting the inspection device.

Embodiment 2

Based on Embodiment 1, this embodiment provides a telescopic mechanical arm, to replace the plurality of foldable measuring arms 2 in Embodiment 1.

Figure 3:
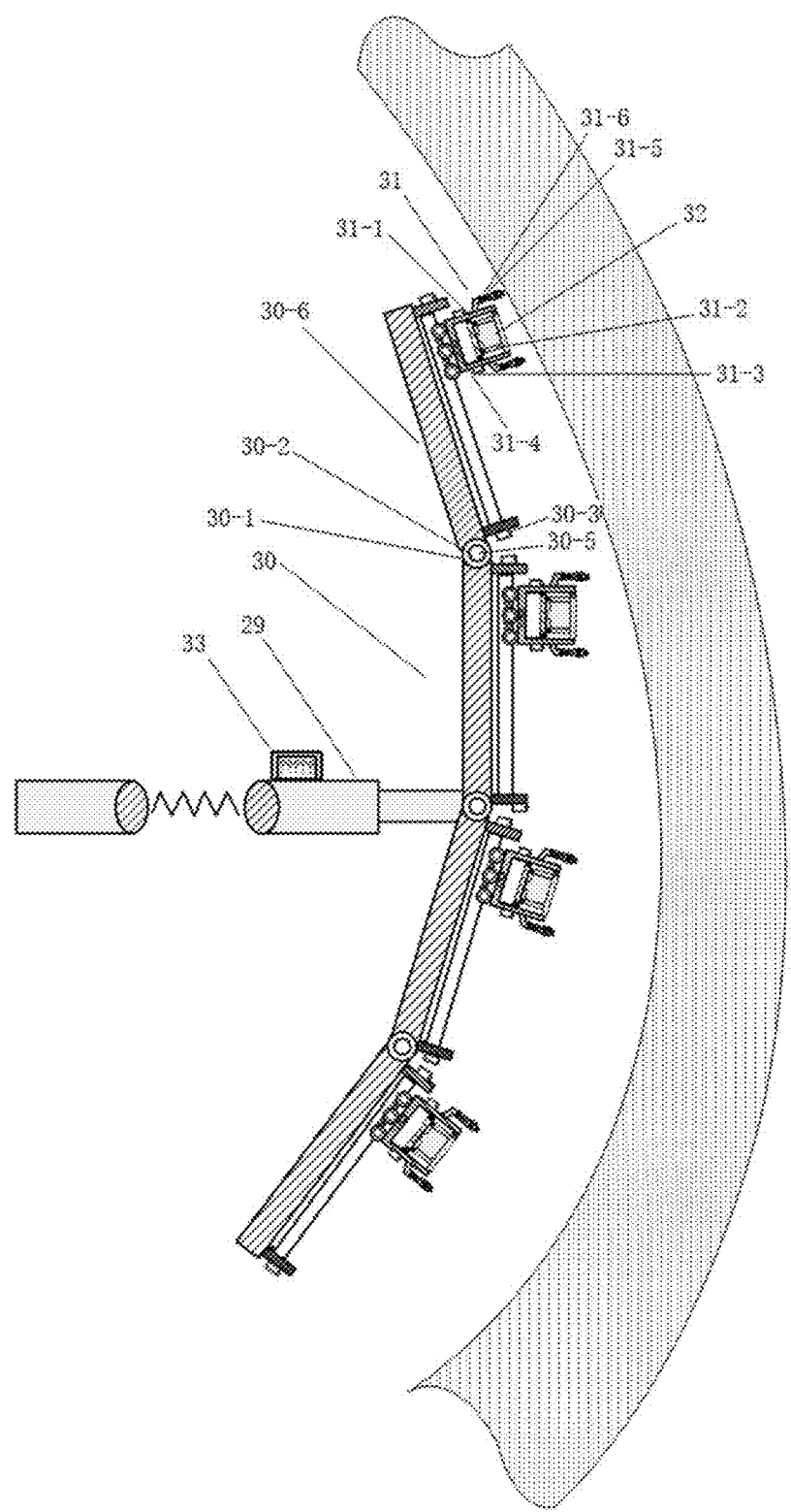
FIG. 3 is a schematic structural diagram of an overall connection between a mechanical arm, a foldable arched push-open device, and a self-adaptive floating type coupled device according to an embodiment of the present disclosure.

The mechanical arm is a telescopic mechanical arm 29. As shown in FIG. 3, an end of a working end of the mechanical arm, namely, an end of an extension arm, is connected to a self-adaptive floating type coupled device by using a foldable arched push-open device 2. Specifically, the mechanical arm is an industrial mechanical arm. An extension arm of the mechanical arm is configured to move the self-adaptive floating type coupled device to a position near a lining surface.

The foldable arched push-open device 30 includes a plurality of (four in this embodiment) supporting frames connected to each other, and two adjacent supporting frames are connected through rotation of a rotary shaft, and the rotary shaft is driven by a reducer; and a torque sensor is disposed on a transmission output shaft of the reducer. A hinge is further disposed on an outer layer of a joint between two adjacent supporting rods, and is configured to limit a rotation angle to be within a range of 0° to 120°. Each supporting frame is provided with an electric guide rail in a direction consistent with the supporting frame, a pulley is disposed on each electric guide rail, and the self-adaptive floating type coupled device 31 is fixed to each pulley by using a flange, and is capable of moving along the electric guide rail.

A position sensor 30-4 is mounted on the pulley of the electric guide rail, and is configured to sense a position of the self-adaptive floating type coupled device on the electric guide rail. The movement of the self-adaptive floating type coupled device on the guide rail enables the self-adaptive floating type coupled device to reach a specified measurement point or measurement line, and avoid obstacles.

A laser ranging sensor 30-3 is disposed on either end of each electric guide rail, and is configured to sense a distance between either end of the guide rail and a measured surface.

Figure 4:
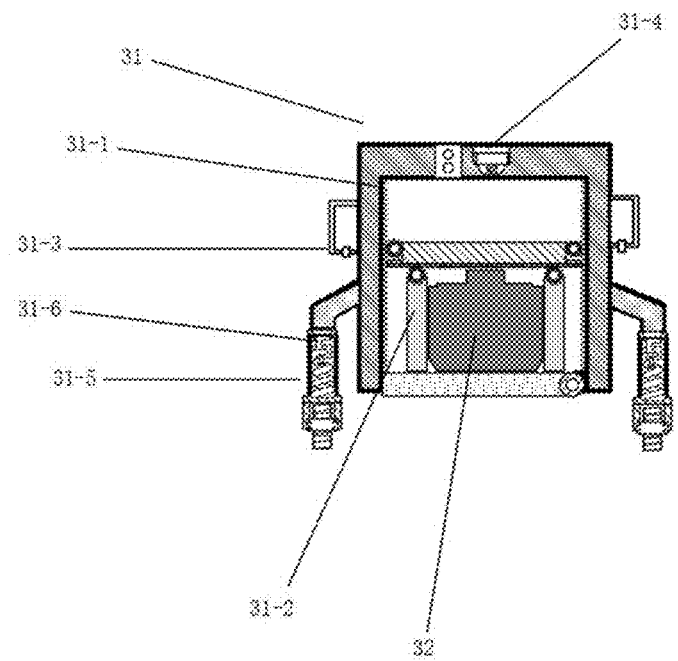
FIG. 4 is a schematic structural diagram of a self-adaptive floating type coupled device for nondestructive inspection in a tunnel lining according to an embodiment of the present disclosure.

As shown in FIG. 4, the self-adaptive floating type coupled device 31 includes: a housing 31-1, where one or more telescopic elastic wheels 31-5 are provided on an outer surface of the housing 31-1, and are all configured to bond to a measured surface of a tunnel lining, and a force transducer 31-6 is built in each telescopic elastic wheel 31-5 for sensing a bonding force between the self-adaptive floating type coupled device and the measured surface; specifically, the telescopic elastic wheel 31-5 includes a rod member connected to the outer surface of the housing 31-1, an end of the rod member is connected to an end of the force transducer 31-6, and the other end of the force transducer 31-6 is connected to an end of a spring, both the force transducer and the spring are accommodated in a columnar accommodating cavity, an end of the columnar accommodating cavity away from the rod member is blocked, and the other end is provided with an opening, and a size of the opening enables the columnar accommodating cavity to be sleeved outside the rod member, and an outer side of the blocked end of the columnar accommodating cavity is connected to a walking wheel by using a bracket. During defect inspection, the walking wheel closely bonds to the measured surface, and pressure is delivered to the force transducer by using the spring, so that the bonding force between the self-adaptive floating type coupled device and the measured surface is measured.

A laser ranging sensor array 31-3 is also disposed on the outer surface of the housing 31-1, and is configured to monitor a distance between the self-adaptive floating type coupled device and the measured surface.

Both the force transducer 31-6 and the laser ranging sensor array 31-3 are connected to a controller. In a device running process, information about the bonding force and distance between the self-adaptive floating type coupled device and the measured surface is transmitted in real time to the controller, and the controller adjusts a relative distance between the self-adaptive floating type coupled device and the measured surface according to the information about the bonding force and the distance, to ensure the safety of the device in a precondition that the self-adaptive floating type coupled device is always kept bonded to the measured surface.

In an implementation, the housing is in the shape of a cube. Each self-adaptive floating type coupled device is provided with four telescopic elastic wheels 3-15, respectively located at four bottom angles of a bottom surface of the self-adaptive floating type coupled device. A spring force transducer is built in a telescopic elastic wheel to feed back a bonding force in the entire bonding process. The four wheels are Mecanum wheels that enable the "force-distance" self-adaptive floating type coupled device to slide in a movement process in contact with the tunnel lining surface, to ensure the continuity of the inspection device in the inspection process.

Figure 6:
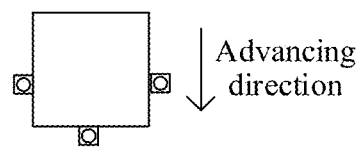
FIG. 6 is a schematic diagram of layout in which a laser ranging sensor array is on a side wall of an outer surface of a self-adaptive floating type coupled device according to an embodiment of the present disclosure.

A laser ranging sensor array 31-2 is mounted on a side surface of each self-adaptive floating type coupled device, and a triangular or rhombic layout manner may be used. In the triangular layout manner, laser ranging sensor arrays 31-2 are mounted on a side surface of an advancing direction and two side surfaces on the left and right of the advancing direction, as shown in FIG. 6. In the rhombic layout manner, laser ranging sensor arrays 31-2 are mounted on all four side surfaces of the self-adaptive floating type coupled device. Whether a small region is flat can be determined by disposing a plurality of laser ranging sensors. In a completed step, first, when the laser sensor in the advancing direction inspects a distance change, then it is determined whether the intermediate laser sensor inspects a distance change, so that whether a point is uneven or a region is uneven can be determined.

When the mechanical arm lifts the "force-distance" self-adaptive floating type coupled device to reach a position of a measurement point on the tunnel lining surface, the distance between the "force-distance" self-adaptive floating type coupled device and the lining surface can be adjusted in real time according to signals fed back by the laser sensor and the spring force transducer in collaboration with the mechanical arm, to ensure the inspection precision of the inspection device.

An obstacle avoidance monitoring device 31-4 is further provided on the outer surface of the housing 31-1 facing toward the advancing direction, is composed of a laser radar and a surveillance camera, and is configured to monitor front lining surface information in a running process.

The laser radar and the surveillance camera transmit the front lining surface information obtained in the running process to the controller, and the controller then recognizes a front obstacle by using recognition algorithms such as Fast-RCNN or Faster-RCNN, and generates an early-warning obstacle avoiding action in collaboration with controlling attitudes of the mechanical arm and the self-adaptive floating type coupled device.

A nondestructive inspection device fixing platform 31-2 is further disposed in the housing for fixing the nondestructive inspection device 32, configured to inspect internal defects of the tunnel lining structure. Clamping slots configured to fix nondestructive inspection devices such as an ultrasonic detector, a ground penetrating radar or a terahertz inspection device probe are reserved on the nondestructive inspection device fixing platform 31-2. To fix the nondestructive inspection device more securely, and improve the inspection stability and precision, a rack is disposed on each of two opposite side surfaces in the housing; the nondestructive inspection device fixing platform includes a horizontal guide rail and two vertical guide rails vertically connected to the horizontal guide rail; gears are respectively disposed on two ends of the horizontal guide rail, and are respectively engaged with the two racks; a rack is disposed on a side for fixing the nondestructive inspection device of the horizontal guide rail, and the two vertical guide rails are engaged with the rack on the horizontal guide rail by using gears. The foregoing gears are all connected to a driving motor, and the driving motor is connected to the controller. By controlling the relative position of the horizontal guide rail in the housing and the distance between the vertical guide rails, nondestructive inspection devices of different sizes and different shapes can be fixed in the self-adaptive floating type coupled device. The clamping slot for fixing the nondestructive inspection device is provided on the horizontal guide rail.

A transparent cover body is disposed on a bottom surface of the housing, namely, a surface facing toward a measured device. Materials such as acrylic plates, polylactide plates, and polystyrene plates may be used, and the materials have no impact on signals in the ground penetrating radar wave inspection direction.

The other parts of the housing, the foldable arched push-open device, and the extension arm are made of lightweight materials such as carbon fibers and nanofibers. The foregoing materials can greatly reduce the weight of the device itself, and can carry heavier nondestructive inspection devices, to achieve the stability of the inspection device in the moving inspection process.

The reducer, the torque sensor, the laser ranging sensors, and the position sensor are all connected to the controller, so that a distance from the surface of the measured region and the angle information of the arched unfolded guide rail and the information about the distance between the two ends of each guide rail and the measured surface can be measured in real time. The controller adjusts the rotation angle of each rotary shaft in real time by using the reducer according to the rotation angle between the guide rails and the distance from the measured surface that are fed back, so that the unfolded arched push-open device can fit the lining surface of different radians.

Figure 5:
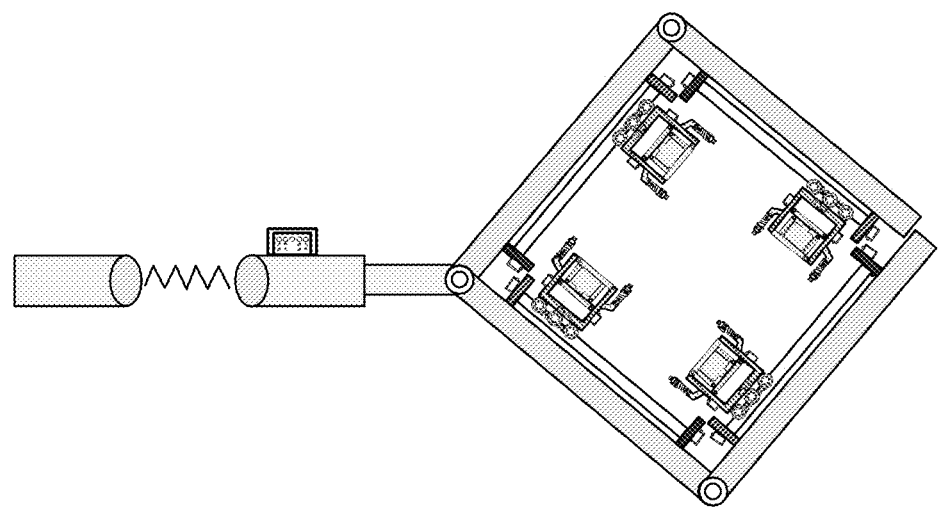
FIG. 5 is a schematic diagram of a foldable arched push-open device after folding according to an embodiment of the present disclosure.

The structure of the foldable arched push-open device 30 not only realizes the adaptability to the lining surface of different radians in the process of tunnel lining defect inspection, but also facilitates storage in a non-operating state, as shown in FIG. 5.

The mechanical arm and the controller are both mounted on a moving platform of a defect inspection robot for implementing linkage control of a plurality devices, namely, the multi-shaft mechanical arm device 29, the foldable arched push-open device 30, and the self-adaptive floating type coupled device 31 and the obstacle avoidance surveillance device 32 that carry inspection devices, to ensure precise bonding between the inspection device and a tunnel lining inner wall and quick movement.

Figure 7:
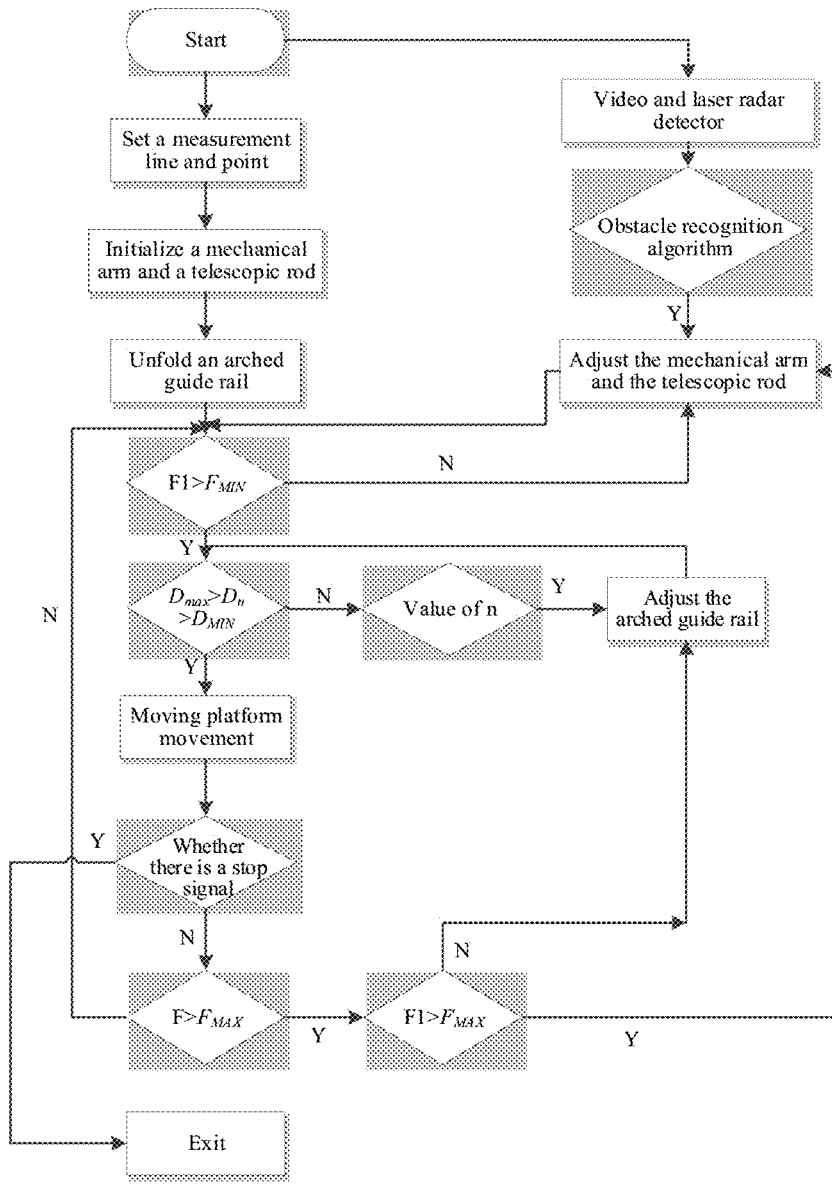
FIG. 7 is a schematic flowchart of a method for controlling a self-adaptive floating type coupled device according to an embodiment of the present disclosure.

After the defect inspection robot is started, the mechanical arm is first initialized, the foldable arched push-open device is unfolded and sent to a position near the measured surface; the controller receives, in real time, sensing information sent by the ranging sensor and the force transducer on the self-adaptive floating type coupled device, the front measured surface information sent by the obstacle avoidance monitoring device, the sensing information sent by the ranging sensor on the foldable arched push-open device, and the like; in collaboration with controlling the adjustment of the mechanical arm and the foldable arched push-open device, as shown in FIG. 7, the specific control process is as follows:

(1) it is determined whether a contact force of the electric guide rail at the highest position after the foldable arched push-open device is unfolded is greater than a minimum contact force, if not, the mechanical arm is adjusted to make the self-adaptive floating type coupled device on the guide rail to be more closely bonded to the measured surface; if yes, step (2) is entered; in this embodiment, the electric guide rail at the highest position is the second rail from bottom to top;

(2) it is determined whether the distance between an end portion of each guide rail and the lining surface is within a specified range, if not, the number of the guide rail whose distance is not within the specified range is obtained, and the foldable arched push-open device is adjusted, to enable the distance between the end portion of the guide rail and the measured surface to be within the specified range; if yes, initialization ends, the defect inspection robot moves for surface defect inspection, and step (3) is entered;

(3) during the movement, it is determined whether there is a stop signal, the stop signal includes a defect inspection end signal; if yes, the defect inspection robot is controlled to stop running; if not, it is determined whether there is a contact force between the guide rail and the measured surface greater than a specified maximum contact force; if yes, a re-initialization stop signal is generated to control the defect inspection robot to stop moving, and step (4) is entered; and (4) it is determined whether the contact force of the electric guide rail at the highest position is greater than the specified maximum contact force, if yes, the mechanical arm is adjusted to loosen the bonding between the self-adaptive floating type coupled device on the electric guide rail at the highest position and the measured surface; and if not, the foldable arched push-open device is adjusted for returning to step (2).

During the movement, the distance data transmitted by the laser ranging sensor of the self-adaptive floating type coupled device is always determined; a rule for determining the distance between the self-adaptive floating type coupled device on any guide rail and the lining surface is as follows:

It is first determined in the advancing direction whether the distance of the first laser ranging sensor is within a specified range, if yes, movement continues to be performed; if not, it is determined whether distances measured by the second and third laser ranging sensors are within the specified range, if yes, the distance of the self-adaptive floating type coupled device is not changed, and if not, movement is stopped to perform a bonding operation again.

During movement of the moving platform, whether there is an obstacle ahead is determined according to front measured surface information sent by the obstacle avoidance monitoring device; when there is an obstacle, one or more obstacle avoiding manners are selected according to the size, the shape, and the position of the obstacle. The obstacle avoiding manners include: adjusting a position of the self-adaptive floating type coupled device on the electric guide rail, adjusting rotation angles between supporting rods of the foldable arched push-open device, and adjusting a telescopic length of the mechanical arm. For example, if the obstacle is very small, obstacle avoidance can be implemented by adjusting the position of the self-adaptive floating type coupled device on the electric guide rail.

The self-adaptive floating type coupled device provided in this embodiment is a "force-distance" self-adaptive floating type coupled device. The self-adaptive floating type coupled device is bonded to the lining measured surface by using the telescopic elastic wheel, and the bonding force is obtained by using the force transducer built in the telescopic elastic wheel, and the distance from the measured surface is obtained by using the laser ranging sensor array on the self-adaptive floating type coupled device; the degree of bonding between the self-adaptive floating type coupled device and the measured surface is adjusted based on the bonding force and the distance between the self-adaptive floating type coupled device and the measured surface, so that not only it can be ensured that the self-adaptive floating type coupled device can be bonded to the measured surface all the time, but also it can be ensured that the self-adaptive floating type coupled device is not damaged due to unevenness of the measured surface.

In addition, on the self-adaptive floating type coupled device, the laser ranging sensor arrays are arranged on a plurality of side surfaces of the self-adaptive floating type coupled device, to ensure monitoring of an entire bonding surface between the self-adaptive floating type coupled device and the measured surface, thereby ensuring the device safety.

The nondestructive inspection device fixing platform is disposed in the self-adaptive floating type coupled device of this embodiment, and clamping slots of probes of inspection devices such as an ultrasonic detector, a ground penetrating radar and a terahertz inspection device are reserved, so that nondestructive inspection devices can be mounted according to user requirements.

The self-adaptive floating type coupled device in this embodiment is disposed on the foldable arched push-open device formed by connection of a plurality of supporting rods; the distances between the plurality of supporting rods and the measured surface are monitored in real time by using the ranging sensors, and angles between the plurality of supporting rods are adjusted according to the distances, so that in the running process, the plurality of supporting rods of the foldable arched push-open device can adapt to tunnel lining surfaces with different radians.

Embodiment 3

Based on Embodiment 1, this embodiment provides a multifunctional gimbal, to replace the line scan camera base 5 and the linear array camera array 12, and the structured light binocular stereo imaging camera 11 and the infrared thermal imaging device 13 on the robot controller 6.

Figure 8:
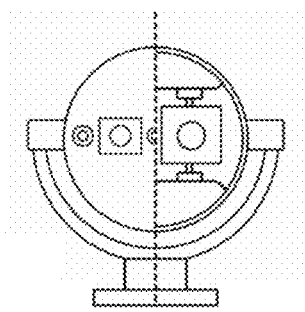
FIG. 8 is a schematic structural diagram of a multifunctional gimbal according to an embodiment of the present disclosure.

As shown in FIG. 8, the multifunctional gimbal is hemispherical, and is disposed above a vehicle body by using a bracket. In this embodiment, the bracket is U-shaped, and the hemispherical multifunctional gimbal is clamped in the U-shaped bracket. Specifically, two sides of the multifunctional gimbal are separately connected to the bracket by using a lateral-roll motor, so that the gimbal can perform pitch movement. The bracket is connected above the vehicle body by using a vertical-roll motor, so that the gimbal can perform rotation in a horizontal direction.

To sense in real time and accurately control movement of the gimbal, a plurality of sensors including a three-axis gyroscope and torque sensors are further disposed in this embodiment. The gyroscope is disposed on the bracket. The torque sensors are disposed on motors. The gyroscope and the torque sensors are respectively configured to obtain rotation acceleration and rotation angle information of the gimbal, and torque signals of the motors for transmission to a controller. The gyroscope and the torque sensors are all connected to the controller. The controller receives rotation direction, angular velocity, and rotation acceleration information sent by the gyroscope, and torque information sent by three torque sensors, and generates intervention signals for rotation of three driving motors by using a preset gimbal swing program based on image distortion feedback and motor torque feedback information obtained through image processing, and separately adjusts rotation speeds of the three driving motors in real time.

A plurality of inspection modules for defect inspection are disposed in the multifunctional gimbal, and are all connected to the controller. The plurality of inspection modules include: a three-dimensional modeling and deformation inspection module, a crack and peeling-off inspection module, a leakage inspection module, and a laser ranging module. The three-dimensional modeling and deformation inspection module is configured to model the tunnel surface lining for overall observation of the tunnel; the crack and peeling-off inspection module is mainly composed of a visible light camera, which is responsible for shooting an optical image of the tunnel surface lining, for inspecting naked-eye-visible cracks and peeling-off of the tunnel surface lining; the leakage inspection module is mainly composed of an infrared thermal imaging camera, which is responsible for shooting a possible low temperature region on the surface or shallow layer of the tunnel, for inspecting possible leakage inside the tunnel; the laser ranging module is mainly composed of a laser rangefinder, which is responsible for acquiring the "image-object" distance, providing a conversion relationship between image space and physical space, and providing support for a series of defect data analysis such as subsequent defect geometrical parameter assessment, sampling image specification calibration, and multi-defect data overlaying.

A shell of a supporting platform of the multifunctional gimbal is made of stainless steel or a plastic alloy and is hemispherical. Four holes are provided on a hemispherical section to accommodate a laser emitting unit of the three-dimensional modeling and deformation inspection module, the visible light camera of the crack and peeling-off inspection module, the infrared camera of the leakage inspection module, and a laser emitting unit of the laser ranging module, and the sizes of the four holes are all greater than the size of the laser emitting unit or camera separately accommodated therein, and provide space for rotation thereof, forming a "four-eye" device. The positional relationship between the visible light camera of the crack and peeling-off inspection module, the infrared camera of the leakage inspection module, and the laser emitting unit of the laser ranging module meets: the three are on the same horizontal line, and the laser emitting unit of the laser ranging module is located at the center, the visible light camera and the infrared camera are respectively located on two sides of the laser emitting unit, and are at the same distance from the laser emitting unit. In this embodiment, the infrared camera and the visible light camera are respectively placed on two sides of the laser rangefinder at a distance of 5 cm.

The three-dimensional modeling and deformation inspection module, the crack and peeling-off inspection module, the leakage inspection module, and the laser ranging module are all fixed in the multifunctional gimbal by using a supporting mechanism. The laser ranging module is disposed in the middle of the supporting mechanism. The crack and peeling-off inspection module and the leakage inspection module are respectively disposed on two sides of a laser rangefinder, and are disposed on the supporting mechanism by using steering motors. The two steering motors are respectively configured to control steering of the crack and peeling-off inspection module and the leakage inspection module, so that visual field centers of the visible light camera of the crack and peeling-off inspection module and the infrared camera of the leakage inspection module and the point position of a laser emitting unit of the laser ranging module overlap in the defect inspection process, and the completely same tunnel lining surface is imaged. Due to the distance between the two inspection devices, when the camera shooting angle is not adjusted, although the infrared camera and the visible light camera point to the same direction, there are still some errors in the shot lining surface, resulting in a positional deviation during subsequent defect data fusion, and causing a defect level assessment error. Therefore, a small-angle steering motor is mounted below each inspection device, the controller sends a control signal to adjust the rotation angle of each steering motor in real time based on distance information of the rangefinder and feedback information of multi-image matching correction, and the inspection devices on left and right sides are respectively rotated to the middle by corresponding angles, and the specific value of the angle is calculated by an image processing unit of the controller based on the distance information fed back by the laser rangefinder. Generally, the values of rotation angles of the steering motors on two sides are the same and the directions are opposite, so that the center of the visible light image, the center of the infrared image and the laser ranging point position overlap. The position of three-dimensional modeling and deformation inspection module may be located above or below the laser rangefinder, and is not limited herein, and the position of the three-dimensional modeling and deformation inspection module is set to ensure stability of the gimbal.

The mounting positions of the four inspection modules are related to weights thereof, and the objective is to ensure the stability of the gimbal during rapid reciprocating swing. Weight information of each inspection module is pre-obtained, and through allocation by the supporting mechanism inside the supporting platform as well as retrofitting of limiting blocks on two sides of the inspection modules on the supporting mechanism, the gravity centers of the devices do not excessively offset during the swing, to ensure that rotation speeds of the driving motors are not affected by offsets of the gravity centers. The specific method for obtaining the gravity information is not limited herein. In this embodiment, offset information of the gravity centers of the inspection devices relative to rotary shafts of the three driving motors is determined according to initial gravity information of the inspection devices by obtaining torque information and rotation information, and the offset information is obtained through calculation by the controller, and gravity initialization is performed on the gimbal according to the offset information.

A mobile client and a controller of a comprehensive defect inspection device are connected by using a wireless communication module, a tunnel lining structural defect inspection result sent by the wireless communication module is received in real time, and a control signal is sent to the controller.

The mobile client is divided into a master client installed on a computer and a slave client installed on a mobile phone. All data from a tunnel inspection vehicle can be received by using an application installed on the computer, and an instantaneous control signal can be sent to the tunnel inspection vehicle at the same time, for human intervention of a possible special case. The slave client mounted on the mobile phone supports an Android platform and an iOS platform, and can receive inspection data and some key information from the tunnel inspection vehicle in real time.

A working method for tunnel lining structural defect comprehensive inspection includes the following working steps:

S1. Before the start of each inspection operation, the controller receives, by using the wireless communication module, a startup instruction sent by the mobile client, and controls the startup of the moving carrier, the gimbal, and the inspection modules, where the startup instruction includes a route of this defect inspection operation, a swing speed of the gimbal, and a moving speed of the moving carrier, and steps S2, S3, and S4 are synchronously performed.

S2. After the multifunctional gimbal receives the startup instruction, the gimbal is adjusted to face toward the direct right of the moving platform and start to perform a swing action at a constant speed along a cross section of the tunnel. Specifically, the swing speed may be determined according to visible light and infrared imaging quality. When the swing speed is excessively large, the image distortion degree is excessively large, and accurate judgment cannot be performed.

S3. After receiving the startup instruction, the smart moving carrier performs an advancing action according to a preset speed and route of the program.

S4. After receiving the startup instruction, the comprehensive inspection device automatically adjusts the inspection modules to ensure that different inspection modules shoot the same target region; the inspection modules and the laser ranging module are started at the same time, and perform the shooting action synchronously. During advancement of the moving carrier, with the swing of the multifunctional gimbal, the images of the same tunnel lining are taken simultaneously and synchronously. The laser ranging module records the distance information of the center point of the current image in real time, and transmits the comprehensive data to the controller separately and simultaneously for image processing.

S5. After receiving the comprehensive data sent by the compressive inspection device, an image and digital acquisition unit in the controller sends the compressive data to an image processor for processing and analysis of the compressive data, and then a result is sent to a large-capacity storage unit, and defect key information is sent to the mobile client by using a wireless signal transceiver at the same time.

S6. After the moving carrier reaches a preset end point, the controller sends a stop instruction and the device stops.

In step S2, when the gimbal enters the official working state, the vertical-roll motor rotates the orientation of the multifunctional gimbal to the direct right of the vehicle body, and the two lateral-roll motors drive the clamped spherical machine to perform rapid reciprocating swing actions, and drive the hemispherical supporting platform to perform corresponding actions. Generally, the swing angular velocity is greater than 180°/second. The rotation speeds of the driving motors are transmitted back in real time, and the controller dynamically adjusts the rotation speed of the gimbal based on multi-information.

In step S4, the controller receives, in real time, the information that is about the distance from the current measured surface and that is sent by the laser ranging module, and calculates, according to the distances between the infrared camera and the visible light camera and the laser emitting module, and the distance between the laser emitting module and the measured surface, angles by which the infrared camera and the visible light camera need to deflect, so that the left and right cameras shoot the completely same region.

In this embodiment, because the infrared camera and the visible light camera are each at a distance of approximately 5 centimeters from the laser rangefinder, for example, distance information fed back by the laser rangefinder is D (unit: m), so that a rotation angle of a small-range rotation motor is approximately equal to arctan $$\arctan\frac{0.05}{D}.$$

Generally, the rotation angle of the small-angle rotation motor is less than 2 degrees, so that the left and right cameras shoot the completely same region. The rotation of the angle will cause distortion of the captured image. The distorted image can be calibrated and corrected based on the distance information, to finally obtain a tunnel lining surface image of the same region.

In step S5, a specific image processing method is as follows:

S501. The three-dimensional modeling and deformation inspection module obtains contour and deformation information of a tunnel lining structural surface; the crack and peeling-off inspection module obtains image information of a visible light waveband of a target region; the leakage inspection module obtains image information of an infrared optical waveband of the target region on the tunnel lining structural surface; and the laser ranging module obtains information about a distance between the target region on the tunnel lining structural surface and the multifunctional gimbal.

S502. Image data acquired by the inspection modules is preprocessed, so that resolutions and sizes of the visible light image and the infrared image are the same, and a range of an angle between upper and lower boundaries of the image and an actual distance between left and right boundaries of the image can be obtained based on distance information of laser ranging; discrete sampling is performed on the captured consecutive images by using the foregoing information, to obtain sampling images in different segments and at different angles; and the sampling images may be divided into visible light sampling images and infrared sampling images.

S503. Defect recognition and marking is separately performed on the visible light sampling image and the infrared sampling image by using a semantic segmentation neural network.

S504. After a tunnel three-dimensional model is obtained, the sampling images are connected end to end and left to right based on corresponding multifunctional gimbal elevation angle information and vehicle driving position information, and are attached at corresponding positions of the tunnel three-dimensional model.

S505. Tunnel lining surface defect result analysis is performed and includes: scoring the defect severity according to measured geometrical parameters of defects of cracks, peeling-off, and leakage, where the score is positively related to danger levels; and calculating a sum of scores of all defects in a comprehensive defect image obtained after data overlaying, and sorting according to scores.

In S505, a crack and peeling-off image captured by visible light is used as a base map, a leakage defect possibly appears in an additional infrared image, and geometrical parameters of all defects are estimated based on distance information and the scoring is performed according to danger levels.

Each image records position information obtained by the smart moving carrier and angle information obtained by the multifunctional gimbal, and then outputs an obtained result to the client.

Through comprehensive defect scoring and three-dimensional visualization, a maintenance person can quickly determine a priority of a defect degree, and quickly position a corresponding position of the defect, helping in-time maintenance.

After obtaining tunnel defect image processing results, the controller distributes all defect data results to one master client and a plurality of slave clients. The master client is composed of a computer, and the slave client may be a mobile phone or a computer. The master client is also responsible for receiving vehicle operation information, including battery fuel residual, battery temperature, service life, and vehicle position and speed. Generally, the tunnel inspection vehicle works according to a preset program, but in the case of special circumstances or human intervention, the tunnel inspection vehicle performs execution preferentially according to an instruction sent by the master client, and the priority of the instruction is highest. The method can ensure that the processing information is simultaneously sent to an inspection party and a maintenance party, to improve the processing efficiency of the tunnel surface lining defects.

In this embodiment, a plurality of defect inspection modules including a laser ranging module, visible light imaging and infrared imaging modules, and a laser radar are used; the "multi-eye" gimbal is set up, the laser ranging module is used as the center, and the distance measured by the laser ranging module from the measured surface is used as reference, to correct directions of the visible light camera and the infrared camera, to ensure that imaging is performed on the same target region, thereby facilitating subsequent comprehensive judgment.

In this embodiment, gravity centers of the plurality of defect inspection modules in the gimbal are allocated based on initial weights of the plurality of defect inspection modules and gravity center positions of the plurality of defect inspection modules in the gimbal, to ensure the stability of the gimbal in the running process.

In this embodiment, when inspection of a plurality of defects is performed by using the "multi-eye" gimbal, comprehensive scoring is also performed based on measured defects, and visualization is performed by using the mobile client. According to the comprehensive scoring result, a relevant maintenance person may perform work coordination according to the complexity and danger level of the defect, and preferentially process a dangerous and complex tunnel defect, thereby greatly improving the working efficiency.

In this embodiment, tunnel three-dimensional reconstruction is performed based on three-dimensional point cloud data, and defect recognition results and scoring results obtained based on visible light and infrared image inspection are overlaid into the three-dimensional model, to enable a maintenance person to quickly determine a priority of the defect degree, and quickly position a corresponding position of the defect for maintenance.

In this embodiment, lithium batteries are introduced into tunnel inspection, to avoid frequent charging, thereby improving the inspection efficiency.

Embodiment 4

Both Embodiment 1 and Embodiment 2 relate to ground generating radars (the wideband air-coupled ground penetrating radar in Embodiment 1 is one of ground penetrating radars). This embodiment provides a deep learning-based ground penetrating radar intelligent inversion method, for implementing defect inspection based on a ground penetrating radar signal in a defect inspection process, and the method includes the following steps:

Step S1: Establish a simulated training data set, where the simulated training data set includes a plurality of ground penetrating radar sectional view-dielectric constant distribution diagram data pairs.

A corresponding simulated data set is established for the problem of inspection of defects in a tunnel lining structure. Step S1 specifically includes:

Step S101: Randomly combine background media and defect internal media, and generate a lining sectional dielectric constant distribution diagram for each combination manner. Specifically, interlayer interfaces and defect contours between various layers of background media on the lining section are fitted, and a plurality of dielectric constant distribution diagrams are generated according to dielectric constants corresponding to various media.

The background media types include plain concrete, reinforced concrete, rocks, soil, and other background media. The defect types include cavities, imperfections, cracks, voids, faults, karst caves, and the like. Defect internal media are water, air, mud, rocks, and other media.

Interlayer interfaces between layers of background media are fitted by using quadratic spline curves. The defect contours are fitted by using irregular complex hyperbolas. In this way, interlayer interfaces that conform to the reality and various complex shapes corresponding to different defect types can be simulated.

Step S102: Perform forward modeling on each dielectric constant distribution diagram, and generate a corresponding ground penetrating radar sectional view, to obtain the plurality of ground penetrating radar sectional view-dielectric constant distribution diagram data pairs.

The forward modeling uses an FDTD method.

Step S103: Use dielectric constant distribution diagram data in each data pair as a tag of the ground penetrating radar sectional view, to obtain the simulated training data set.

Step S2: Construct a ground penetrating radar inversion deep learning network model architecture.

Figure 9:
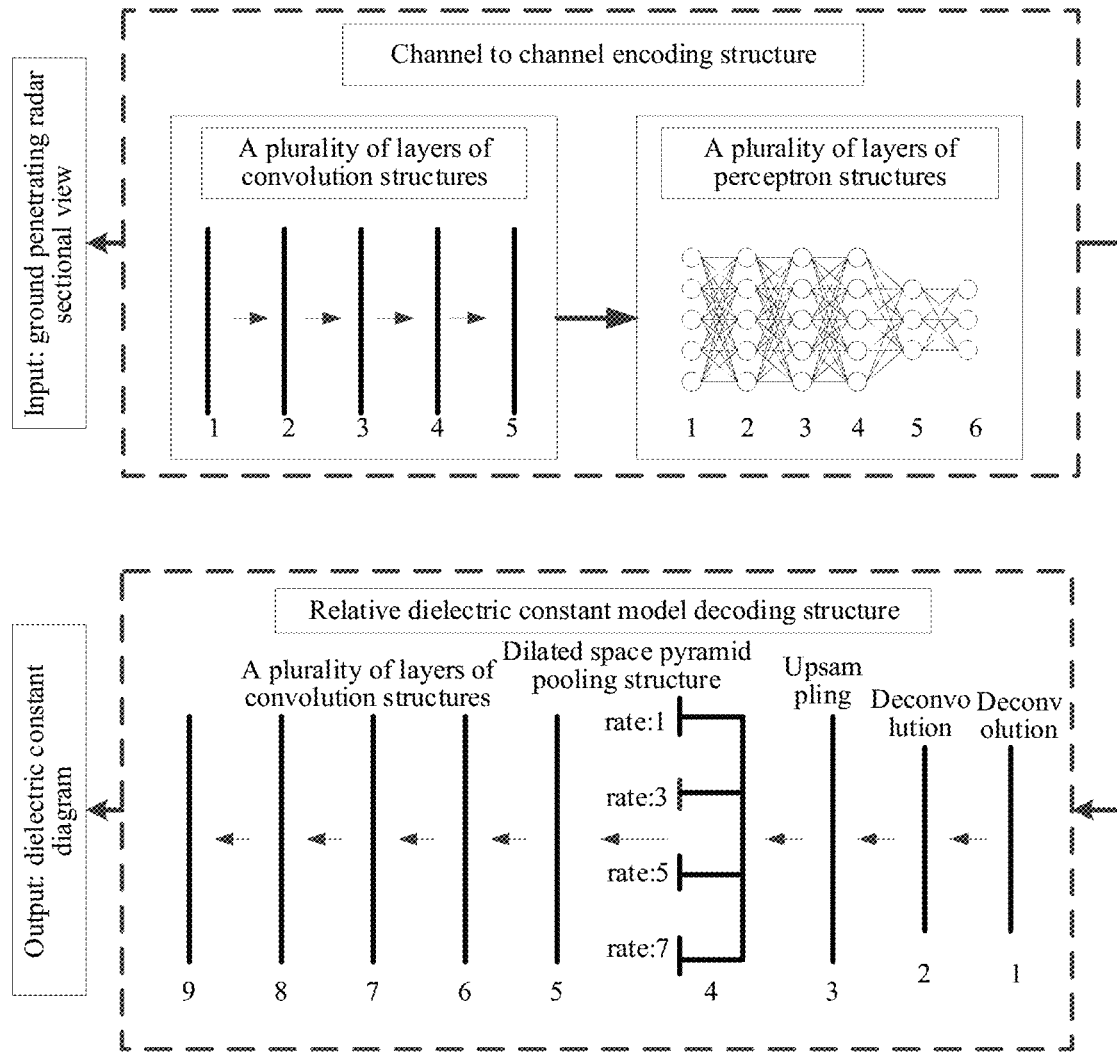
FIG. 9 is a schematic structural diagram of a deep learning network according to an embodiment of the present disclosure.

As shown in FIG. 9, the ground penetrating radar inversion deep learning network model uses a cascading implementation of "a plurality of layers of convolution→a plurality of layers of perceptrons→a plurality of layers of deconvolution", and the network convolution manner, the specific quantity of network layers and the size of a convolution kernel used in each layer are all determined according to data dimensions of the ground penetrating radar inspection data and the dielectric constant model. Two structures are specifically included:

(1) A channel-to-channel encoding structure, implemented by using a plurality of layers of convolution and a plurality of layers of perceptrons. The plurality of layers of convolution structures are used to enhance ground penetrating radar single-channel data by using neighborhood information. The plurality of layers of perceptron structures are used to compress and restructure each channel of enhanced ground penetrating radar single-channel data, and splice the data in order, to achieve sufficient neighborhood information extraction and correspondence of spatial feature information between data pairs.

In an implementation, the plurality of layers of convolution structures include five convolutional layers. There are six layers of perceptron structures. The size of the convolution kernel of the convolutional layer is 5*5, to achieve sufficient neighborhood information extraction and correspondence of spatial feature information between data pairs.

In another implementation, the plurality of layers of convolution structures include a plurality of convolutional layers and a dilated space pyramid pooling structure. Specifically, any one of second to fourth layers in the plurality of convolution structures may be replaced with the void place pyramid pooling structure, which is formed by parallel connection of dilated convolutions of four different resolutions (resolutions of 1, 3, 5, and 7), and the size of the convolution kernel is determined as 3*3, for expanding the receptive field and extracting multi-scale features, making full use of the effective information in the original data, and realizing the neighborhood enhancement of the original information.

The plurality of layers of perceptron structures are used for compressing single-channel features, to remove irrelevant and redundant features, and implement "restructuring" of effective information in the data. To effectively realize the feature compression of single-channel ground penetrating radar data, it is determined that the quantity of layers of the perceptrons is not less than six, and the dimensions of the layers are determined according to a ratio of single-channel data features to a dielectric constant model.

Figure 10:
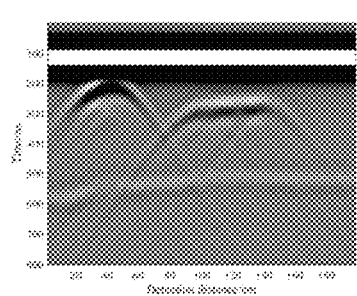
FIG. 10 shows simulated ground penetrating radar inspection data according to an embodiment of the present disclosure.
Figure 11:
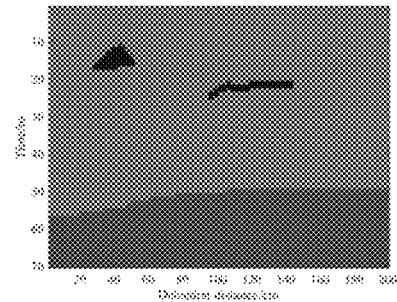
FIG. 11 is a diagram of a simulated dielectric model according to an embodiment of the present disclosure.
Figure 12:
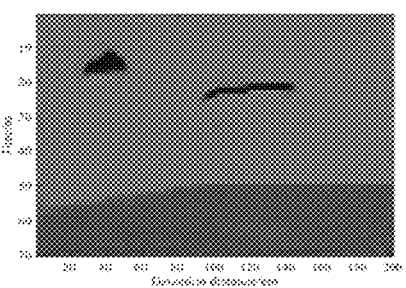
FIG. 12 is a diagram of prediction of a deep learning network according to an embodiment of the present disclosure.

As shown in FIG. 10, each detection distance value on the horizontal coordinate corresponds to a channel of ground penetrating radar inspection data. As shown in FIG. 11, ground penetrating radar inspection data corresponding to the defect is inconsistent with the detection distance range corresponding to the dielectric constant, or in other words, the spatial feature information is not in complete correspondence, and the detection distance range corresponding to the ground penetrating radar inspection data corresponding to the defect is larger. To enable features to be in more accurate correspondence in the ground penetrating radar inspection data diagram and the dielectric constant distribution diagram, in this embodiment, each channel of single-channel ground penetrating radar data is enhanced by using a plurality of layers of convolution structures. Feature information of adjacent channels is fused, to make single-channel ground penetrating radar data feature information richer, and be in better correspondence to the detection distance range of the dielectric constant, thereby ensuring accuracy of a subsequent model.

(2) A relative dielectric constant model decoding structure: a ground penetrating radar inspection data feature is obtained, the quantity of deconvolutional layers and convolution manner are determined according to a ratio of extracted data feature dimensions to dimensions of the dielectric constant model, a convolution kernel with a size of 3*3 is used, and eight or more layers of convolution structures are determined, to implement reconstruction of the dielectric constant distribution diagram.

In an implementation, the relative dielectric constant model decoding structure includes nine layers of convolution structures, and the first and second layers are deconvolutional layers to implement the expansion from the feature map to the model, and a dropout operation is added to improve the generalization capability of the model; the third layer is an upsampling layer, which uses bilinear interpolation to achieve the dimensional correspondence between data and the model; the fourth layer is a dilated space pyramid pooling structure, which is formed by parallel connection of dilated convolutions of four different resolutions (resolutions of 1, 3, 5, and 7), for expanding the receptive field; and the fifth to ninth layers perform data feature fusion by using five layers of convolution, to reconstruct the dielectric constant distribution diagram.

The relative dielectric constant model decoding structure first uses a plurality of layers of deconvolution to implement the expansion from the feature map to the model, and then uses bilinear interpolation to achieve the dimensional correspondence between the ground penetrating radar inspection data and the dielectric constant model, and uses dilated convolutions of different resolutions to form a dilated space to form a pyramid pooling structure to expand the receptive field, and finally uses a convolutional neural network for data feature fusion, to reconstruct information at corresponding positions by using single-channel features, and reconstruct a dielectric constant model. When the plurality of layers of deconvolution and dilated convolution structures are used to expand the data dimensions, the ground penetrating radar data features extracted by the encoder are fully fused, to reconstruct the information at the corresponding positions of the dielectric constant distribution diagram by using the single-channel ground penetrating radar data features, and generate the dielectric constant distribution diagram through prediction.

Step S3: Obtain a defect-free ground penetrating radar cross-section image of background noise obtained through actual detection, fuse the sectional view with a ground penetrating radar sectional view in the simulated training data set, to form "pseudo-real" data, to obtain a training data set for model training, and train a ground penetrating radar inversion deep learning network model, to obtain a model parameter.

The ground penetrating radar cross-section image of background noise is fused with the ground penetrating radar sectional view through strength normalization. The ground penetrating radar background noise sectional view obtained through actual detection can reflect a real background situation of the lining section, and is added to the ground penetrating radar sectional view in the simulated training data set, to obtain a new training data set, to train the ground penetrating radar inversion model, thereby recognizing defects of the lining structure more accurately.

An error gradient of the ground penetrating radar inversion deep learning network is optimized by using an ADAM optimization algorithm and a loss function combining a mean square error (MSE) and a multi-scale structural similarity image measurement (MS_SSIM), to construct a ground penetrating radar intelligent inversion model.

Step S4: Perform inversion on ground penetrating radar inspection data acquired in real time based on the ground penetrating radar inversion deep learning network model, to obtain a corresponding dielectric constant distribution diagram.

When the deep learning model parameter is substituted into the initial deep learning model, a prediction model that can be actually used can be obtained. Then pyinstaller is used to package the prediction model into an EXE application to generate an interface that can be used by a user. The user may input the acquired ground penetrating radar inspection data, and then the prediction model performs inversion on the ground penetrating radar inspection data, to generate a dielectric constant distribution diagram, and a storage location of the generated dielectric constant distribution diagram can be selected by the user.

The background media and defect forms in the measured section of the lining and filling media in the defects can be restored according to the dielectric constant distribution diagram, to achieve the objective of defect inspection.

Based on the foregoing method, the embodiments of the present disclosure further provide a deep learning-based ground penetrating radar intelligent inversion system, including:
- a simulated training data set obtaining module, configured to obtain a simulated training data set, where the simulated training data set includes a plurality of ground penetrating radar sectional view-dielectric constant distribution diagram data pairs;
- a ground penetrating radar inversion model construction module, configured to obtain a ground penetrating radar inversion deep learning network model according to the simulated training data set; and
- a ground penetrating radar inspection data real-time inversion module, configured to perform dielectric constant inversion according to ground penetrating radar inspection data acquired in real time based on the ground penetrating radar inversion deep learning network model.

Based on the foregoing method, the embodiments of the present disclosure further provide an electronic device, including a memory, a processor, and a computer program stored in the memory and capable of being run on the processor, where the processor implements the deep learning-based ground penetrating radar intelligent inversion method when executing the program.

Based on the foregoing method, the embodiments of the present disclosure further provide a computer program product, where the deep learning-based ground penetrating radar intelligent inversion method is implemented when the program product is executed by a processor.

In the foregoing inversion method, ground penetrating radar inspection data information is fully learned by using a deep learning method, and can be used to implement automatic inversion on complex ground penetrating radar inspection data. The method simultaneously realizes relatively high inspection precision and a relatively high processing speed, and ensures the real-time performance of ground penetrating radar data processing. The ground penetrating radar inspection data diagram-dielectric constant distribution diagram data pairs are obtained through simulation, and a plurality of background media are combined with defect filling media, so that sufficient dielectric constant distribution diagram training data can be obtained. Interface curves between media and defect contours are simulated, to make the dielectric constant distribution diagram more real, thereby providing guarantee for the generalization capability of the subsequent model. Defect-free real ground penetrating radar inspection data is also obtained, and is used as a background for adding to the simulated training data set, so that the ground penetrating radar inspection data in the training data set is closer to the reality. When the used deep learning network learns features of the ground penetrating radar inspection data, single-channel inspection data is first used as an object, and neighborhood data is used for feature enhancement, and then the enhanced single-channel inspection data is combined, to resolve the problem that the ground penetrating radar data does not correspond to a spatial position of the dielectric model.

The specific implementations of the present disclosure are described above with reference to the accompanying drawings, but are not intended to limit the protection scope of the present disclosure. A person skilled in the art should understand that various modifications or deformations may be made without creative efforts based on the technical solutions of the present disclosure, and such modifications or deformations shall fall within the protection scope of the present disclosure.

What is claimed is:

1. A multi-arm robot used for tunnel lining inspection and defect diagnosis in an operation period, comprising a moving platform, wherein an environment detection device and a defect infection device are disposed on the moving platform, the defect infection device is disposed on the moving platform by using a multi-degree-of-freedom mechanical arm, and an attitude detection module is disposed on the multi-degree-of-freedom mechanical arm;
   a controller receives environmental data sensed by the environment detection device and mechanical arm attitude data sensed by the attitude detection module, and sends a control instruction to the moving platform and the multi-degree-of-freedom mechanical arm according to the environmental data, to implement movement of the multi-arm robot; and
   the controller receives tunnel lining structural data sensed by the defect infection device, and performs defect diagnosis;
   wherein, the defect infection device comprises a wideband air-coupled ground penetrating radar and/or an X-ray backscattering inspection device, and the environment detection device comprises one or more of a linear array camera array, a near-infrared binocular stereo imaging camera, and an infrared thermal imaging device, and
   wherein the X-ray backscattering inspection device is disposed on the moving platform by using a load mechanical arm, the load mechanical arm is of a three-section mechanical arm structure; a first section of the load mechanical arm is fixed on the moving platform, a power supply and water cooling system is built in a second section of the load mechanical arm, and an end of a third section of the load mechanical arm is connected to the X-ray backscattering inspection device by using a radiation shielding component, and a radiation source and a single-photon detector array are built in the radiation shielding component.

2. The multi-arm robot used for tunnel lining inspection and defect diagnosis in an operation period according to claim 1, wherein the wideband air-coupled ground penetrating radar is disposed on the moving platform by using a foldable mechanical arm, a first section of the mechanical arm is fixed on the moving platform, and a last section of the mechanical arm is connected to a foldable supporting structure; the foldable supporting structure comprises a plurality of supporting rods hinged to each other, and one of the supporting rods is fixedly connected to the last section of the mechanical arm in a vertical angle, and a wideband air-coupled ground penetrating radar is disposed on each supporting rod.

3. The multi-arm robot used for tunnel lining inspection and defect diagnosis in an operation period according to claim 2, wherein each supporting rod is connected to the wideband air-coupled ground penetrating radar by using an adjustable bracket; the adjustable bracket comprises an arc-shaped guide rail, a telescopic rod, and a push-open rod, the telescopic rod is connected to the push-open rod in a crossing and rotation manner, and a first end portion of the telescopic rod and an end portion of the push-open rod are both in slidable connection to an arc-shaped track, a second end portion of the telescopic rod is connected to the supporting rod; and the wideband air-coupled ground penetrating radar is disposed on the arc-shaped track by using a sliding gimbal; and a gear is disposed at a crossing joint between the telescopic rod and the push-open rod, and is connected to a stepmotor; a slideway structure is disposed in an axial direction of the push-open rod, a rack is disposed on a slideway inner wall, and is engaged with the gear on the telescopic rod; and the controller controls the gear to rotate by using the stepmotor.

4. The multi-arm robot used for tunnel lining inspection and defect diagnosis in an operation period according to claim 1, wherein an adsorption load balance component is disposed on a bottom of the moving platform, the adsorption load balance component uses a multi-cavity negative pressure adsorption structure, and when a load mechanical arm works, negative pressure is generated through vacuum air supply for adsorption onto an earth surface.

* * * * *